(12) United States Patent  (10) Patent No.: US 8,638,410 B2
Hsiao et al.  (45) Date of Patent: Jan. 28, 2014

(54) DISPLAY PANEL AND DISPLAY APPARATUS USING THE SAME

(75) Inventors: Chia-Chiang Hsiao, Shenzhen (CN); Chih-Wen Chen, Shenzhen (CN); Chengming He, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 69 days.

(21) Appl. No.: 13/377,140

(22) PCT Filed: Aug. 4, 2011

(86) PCT No.: PCT/CN2011/077983
§ 371 (c)(1),
(2), (4) Date: Dec. 8, 2011

(87) PCT Pub. No.: WO2012/174774
PCT Pub. Date: Dec. 27, 2012

(65) Prior Publication Data
US 2012/0327329 A1 Dec. 27, 2012

(30) Foreign Application Priority Data
Jun. 21, 2011 (CN) .......................... 2011 1 0168119

(51) Int. Cl.
*G02F 1/1335* (2006.01)
(52) U.S. Cl.
USPC .............................. 349/117; 349/15; 349/119

(58) Field of Classification Search
USPC ................. 349/15, 117, 119; 359/489.07
See application file for complete search history.

(56) References Cited

U.S. PATENT DOCUMENTS

| 3,046,849 | A | * | 7/1962 | Bowman ........................ 493/143 |
| 6,239,853 | B1 | | 5/2001 | Winker et al. |
| 6,735,017 | B1 | | 5/2004 | Acosta et al. |
| 2008/0204874 | A1 | | 8/2008 | Kim et al. |
| 2009/0141201 | A1 | * | 6/2009 | Yeh et al. ......................... 349/15 |

FOREIGN PATENT DOCUMENTS

| CN | 101183177 A | 5/2008 |
| CN | 101257639 A | 9/2008 |
| CN | 101872073 A | 10/2010 |
| CN | 101900890 A | 12/2010 |
| WO | 01/25842 A1 | 4/2001 |

* cited by examiner

*Primary Examiner* — Nathanael R Briggs
(74) *Attorney, Agent, or Firm* — Mark M. Friedman

(57) ABSTRACT

The present invention provides a display panel and a display apparatus using the same. The display panel comprises a first substrate, a second substrate, a liquid crystal layer, a first polarizer, a second polarizer, a half (½) wave plate and a quarter (¼) wave plate. The liquid crystal layer is formed between the first substrate and the second substrate. The first polarizer is disposed at an outer side of the first substrate. The second polarizer is disposed at an outer side of the second substrate. The half wave plate is disposed on the first polarizer. The quarter wave plate is disposed on the half wave plate. The invention can improve a chromatic dispersion problem of a 3D display.

13 Claims, 5 Drawing Sheets

DISPLAY PANEL AND DISPLAY APPARATUS USING THE SAME

CROSS REFERENCE TO RELATED APPLICATIONS

The present application is a 35 U.S.C. §371 National Phase conversion of International (PCT) Patent Application No. PCT/CN2011/077983, filed on Aug. 4, 2011, the disclosure of which is incorporated by reference herein. The PCT International Patent Application was filed in Chinese.

FIELD OF THE INVENTION

The present invention relates to a display panel and a display apparatus using the same, and more particularly to a display panel and a display apparatus using the same for displaying a three-dimensional (3D) image.

BACKGROUND OF THE INVENTION

Liquid crystal displays (LCDs) have been widely applied in electrical products. Currently, most of LCDs are backlight type LCDs which include a liquid crystal panel and a backlight module.

At present, the LCDs are capable of having a 3D image displaying function, such as a 3D pattern retarder display which has a quarter (¼) wave plate being disposed at an outer side of an LCD.

In general, the pattern retarder display has left image pixels and right image pixels. The left image pixels are positioned at odd pixel rows (or even pixel rows) of the display, and the right image pixels are positioned at the other pixel rows thereof. When the light of the display passes through the quarter-wave phase retarders with different orientations, the light is transformed into a left handed circularly polarized light and a right handed circularly polarized light, respectively. A user can use circular polarizer glasses with different polarized directions such that the user's left eye only sees images of the left image pixels, and the user's right eye only sees images of the right image pixels. Therefore, the 3D image effect of the display is achieved.

However, a chromatic dispersion of the left path (pixels) and the right path (pixels) can not be compensated simultaneously by the phase retarder of the pattern retarder display, and thus the image crosstalk there-between easily arises.

SUMMARY OF THE INVENTION

The present invention provides a display panel and a display apparatus using the same, so as to solve a chromatic dispersion problem of a 3D display.

A primary object of the present invention is to provide a display panel, and the display panel comprises: a first substrate; a second substrate; a liquid crystal layer formed between the first substrate and the second substrate; a first polarizer disposed at an outer side of the first substrate; a second polarizer disposed at an outer side of the second substrate; a half wave plate disposed on the first polarizer, wherein the half wave plate includes at least two first half wave rows, and a predetermined interval is therebetween each two of the adjacent first half wave rows; and a quarter (¼) wave plate being disposed on the half wave plate.

Another object of the present invention is to provide a display panel, and the display panel comprises: a first substrate; a second substrate; a liquid crystal layer formed between the first substrate and the second substrate; a first polarizer disposed at an outer side of the first substrate; a second polarizer disposed at an outer side of the second substrate; a half (½) wave plate disposed on the first polarizer, wherein the half wave plate includes at least two first half wave rows and second half wave rows, and a predetermined interval is therebetween each two of the adjacent first half wave rows, and the second half wave rows and the first half wave rows are alternately arranged on different layers; a quarter (¼) wave plate disposed on the half wave plate; and a cover substrate disposed on the quarter wave plate.

A further object of the present invention is to provide a display apparatus, and the display apparatus comprises: a backlight module; and a display panel comprising: a first substrate; a second substrate; a liquid crystal layer formed between the first substrate and the second substrate; a first polarizer disposed at an outer side of the first substrate; a second polarizer disposed at an outer side of the second substrate; a half (½) wave plate disposed on the first polarizer, wherein the half wave plate includes at least two first half wave rows, and a predetermined interval is therebetween each two of the adjacent first half wave rows; and a quarter (¼) wave plate disposed on the half wave plate.

In one embodiment of the present invention, the display panel further comprises a cover substrate being disposed on the quarter wave plate.

In one embodiment of the present invention, the half wave plate further includes a plurality of isotropic material rows, and the first half wave rows are alternately arranged with the isotropic material rows.

In one embodiment of the present invention, an angle of 45 degrees is between an optical axis of the quarter wave plate and a transmission axis of the first polarizer, and an angle of $-\theta$ is between the half wave rows and the transmission axis of the first polarizer, and a formula is expressed as follows:

$$-2\theta - 45° = -315°.$$

In one embodiment of the present invention, the half wave plate further comprises a plurality of second half wave rows, and the first half wave rows are alternately arranged with the second half wave rows.

In one embodiment of the present invention, the first half wave rows and the second half wave rows are alternately arranged on the same layer.

In one embodiment of the present invention, the first half wave rows and the second half wave rows are alternately arranged on different layers.

In one embodiment of the present invention, the half wave plate further comprises a plurality of isotropic material rows, and the isotropic material rows are arranged between the first half wave rows and the second half wave rows.

In one embodiment of the present invention, an angle $\psi$ is between an optical axis of the quarter wave plate and a transmission axis of the first polarizer, and angles $\theta 1$ and $\theta 2$ are therebetween the first and the second half wave rows and the transmission axis of the first polarizer, respectively, and formulas are expressed as follows:

$$2\theta 1 + 45 = \psi + 180 * N,$$

$$2\theta 2 + 45 = \psi + 180 * N,$$

wherein N is an integer.

In comparison with the chromatic dispersion problem of the conventional 3D display, the display panel and the display apparatus using the same can utilize the half wave plate to achieve a 3D image, and the chromatic dispersion of the different pixel rows thereof can be compensated simultaneously, thereby improving the chromatic dispersion problem in the conventional 3D display, as well as reducing the image crosstalk of the display apparatus to enhance the image quality of the display apparatus.

The structure and the technical means adopted by the present invention to achieve the above-mentioned and other objects can be best understood by referring to the following detailed description of the preferred embodiments and the accompanying drawings.

DETAILED DESCRIPTION OF THE PREFERRED EMBODIMENTS

Figure 1:
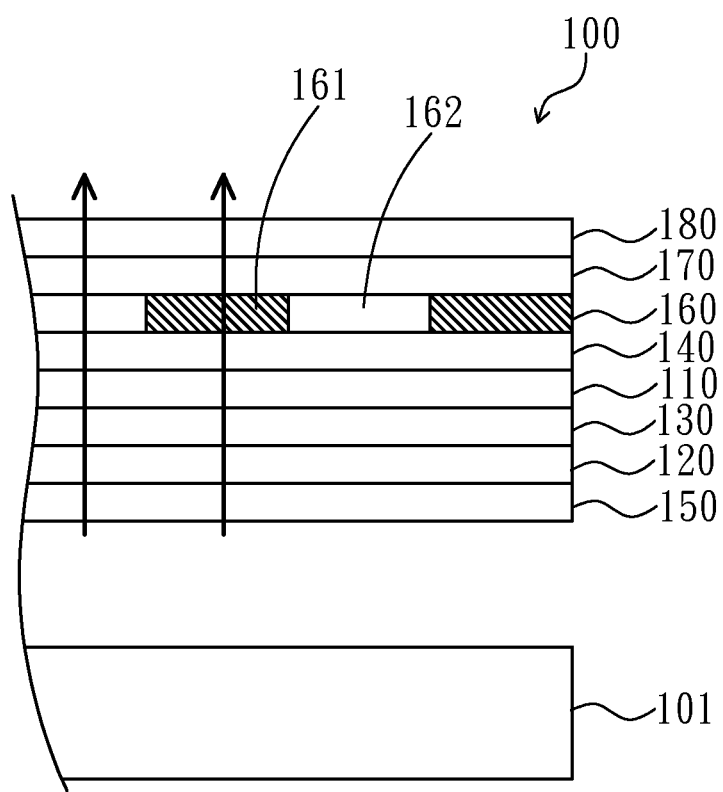
FIG. 1 is a partially cross-sectional view showing a display apparatus according to a first embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Referring to FIG. 1, a partially cross-sectional view showing a display apparatus according to a first embodiment of the present invention is illustrated. The display apparatus of the present embodiment can comprises a display panel 100 and a backlight module 101. The display panel 100 is disposed opposite to the backlight module 101, and the backlight module 101 may be realized as an edge lighting backlight module or a bottom lighting backlight module to provide the liquid crystal display panel 100 with the back-light.

Referring to FIG. 1 again, the display panel 100 of the present embodiment may comprise a first substrate 110, a second substrate 120, a liquid crystal layer 130, a first polarizer 140, a second polarizer 150, a half (½) wave plate 160, a quarter (¼) wave plate 170, and a cover substrate 180. The first substrate 110 and the second substrate 120 may be realized as glass substrates or flexible plastic substrates. In this embodiment, the first substrate 110 may be a glass substrate or other material substrates with color filters (CF), and the second substrate 120 may be a glass substrate or other material substrates with a thin film transistor (TFT) array. It should be noted that the CF and the TFT array may also be disposed on the same substrate in other embodiments.

Referring to FIG. 1 again, the liquid crystal layer 130 is formed between the first substrate 110 and the second substrate 120. The first polarizer 140 is disposed on an outer side of the first substrate 110 and opposite to the liquid crystal layer 130 (i.e. a light-emitting side of the first substrate 110). The second polarizer 150 is disposed on an outer side of the second substrate 120 and opposite to the liquid crystal layer 130 (i.e. a light-incident side of the second substrate 120).

Referring to FIG. 1 again, the half wave plate 160 is disposed on the first polarizer 140, and the quarter wave plate 170 is disposed on the half wave plate 160, and the cover substrate 180 is disposed on the quarter wave plate 170. The cover substrate 180 is, for example, a cover lens which is preferably made of a material of high strength, such as glass, carbon fiber, reinforced plastics or any combination thereof, for protecting and packaging the structure of the display panel 100.

Referring to FIG. 1 again, the half wave plate 160 includes a plurality of first half wave rows 161 and a plurality of isotropic material rows 162. The first half wave rows 161 are alternately arranged with the isotropic material rows 162, and a predetermined interval (e.g. a width of the isotropic material row 162) is between each two of the adjacent first half wave rows 161. The half wave rows 161 have a characteristic of a normal half wave phase retarder for transforming a linearly polarized light into a circularly polarized light and improving the chromatic dispersion problem.

Figure 2:
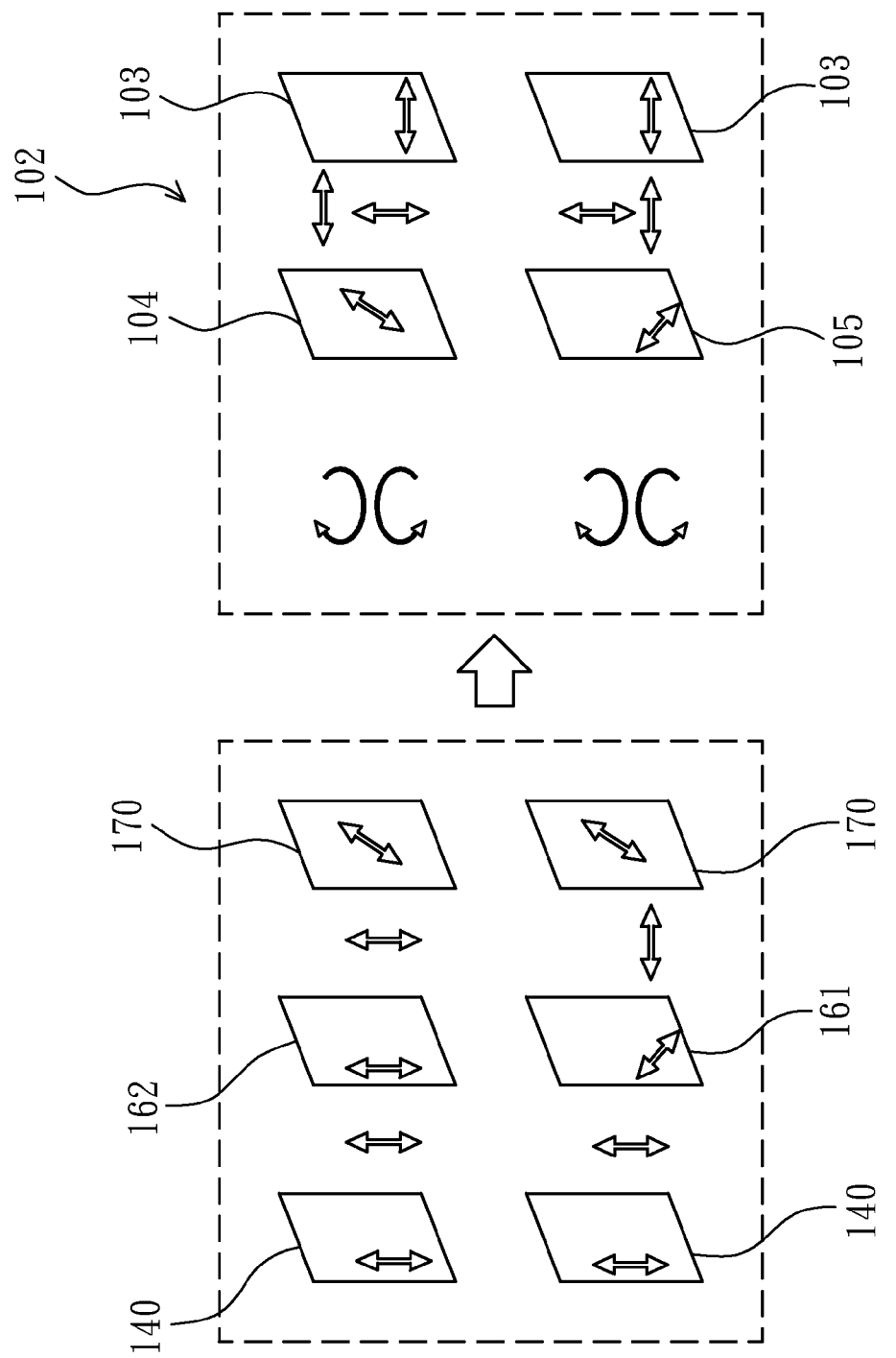
FIG. 2 is a schematic diagram showing a polarized light of the display apparatus according to the first embodiment of the present invention.

Referring to FIG. 2, a schematic diagram showing a polarized light of the display apparatus according to the first embodiment of the present invention is illustrated. In this embodiment, an angle of 45 degrees (with allowable tolerance of ±15°) is between an optical axis of the quarter wave plate 170 and a transmission axis of the first polarizer 140, and an angle of −θ (with allowable tolerance of ±15°) is between the half wave rows 161 of the half wave plate 160 and the transmission axis of the first polarizer 140, and a formula is expressed as follows:

$$-2\theta - 45° = -315°. \tag{1}$$

Referring to FIG. 2 again, for example, θ may be 135 degrees. Therefore, incorporating with the above-mentioned equation (1), a great optical effect between the wave plates 160 and 170 can be ensured for enhancing the 3D image effect of the display apparatus. At this time, the light which is emitted from the first polarizer 140 is the linearly polarized light at 90 degrees. After passing through the isotropic material row 162, the light is still the linearly polarized light at 90 degrees. Subsequently, after passing through the quarter wave plate 170 with the optical axis at 45 degrees, the light is transformed into the left handed circularly polarized light. When the linearly polarized light at 90 degrees passes through the half wave rows 161 with the optical axis at 135 degrees, the light is still the linearly polarized light, but the polarized direction thereof is at 270 degrees. Subsequently, the light is transformed into the right handed circularly polarized light after passing through the quarter wave plate 170 at 45 degrees.

When watching the 3D images of the display apparatus of the present embodiment, polarizer glasses 102 can be used to cooperate with the display apparatus for forming a 3D image effect. The polarizer glasses 102 can include a polarizer 103, a first quarter wave plate 104, and a second quarter wave plate 105. When a user wears the polarizer glasses 102, the polarizer 103 is close to the user's eyes, and the first quarter wave plate 104 and the second quarter wave plate 105 are formed on the polarizer 103 and close to the display panel 100. Furthermore, the first quarter wave plate 104 and the second quarter wave plate 105 are positioned at a left side and a right side of the polarizer glasses 102, respectively.

Referring to FIG. 2 again, when a transmission axis of the polarizer 103 of the polarizer glasses 102 is at 0 degree, and an optical axis of the first quarter wave plate 104 is at 45 degrees, the left handed circularly polarized light is allowed to pass through the polarizer glasses 102, and the right handed circularly polarized light is absorbed. On the contrary, when an optical axis of the second quarter wave plate 105 is at 135 degrees, the right handed circularly polarized light is allowed to pass through the polarizer glasses 102, and the left handed circularly polarized light is absorbed.

When a user views the 3D images of the display apparatus of the present embodiment, the right handed circularly polarized light, which is formed by the half wave rows 161 and the quarter wave plate 170, is only allowed to pass through one side of the polarizer glasses 102 (i.e. a right side or a left side corresponding to the second quarter wave plate 105), and the left handed circularly polarized light, which is formed by the isotropic material row 162 and the quarter wave plate 170, is only allowed to another side (i.e. corresponding to the first quarter wave plate 104) of the polarizer glasses 102. In other words, the user's eyes can see images of different pixel rows of the display panel 100, respectively, thereby forming the 3D image effect.

Therefore, the display panel 100 and the display apparatus using the same can utilize the half wave plate 160 to achieve the 3D image, and the chromatic dispersion of the different pixel rows thereof can be compensated simultaneously for improving the chromatic dispersion problem in the conventional pattern retarder display having a single quarter wave plate, hence reducing the image crosstalk of the display apparatus.

Figure 3:
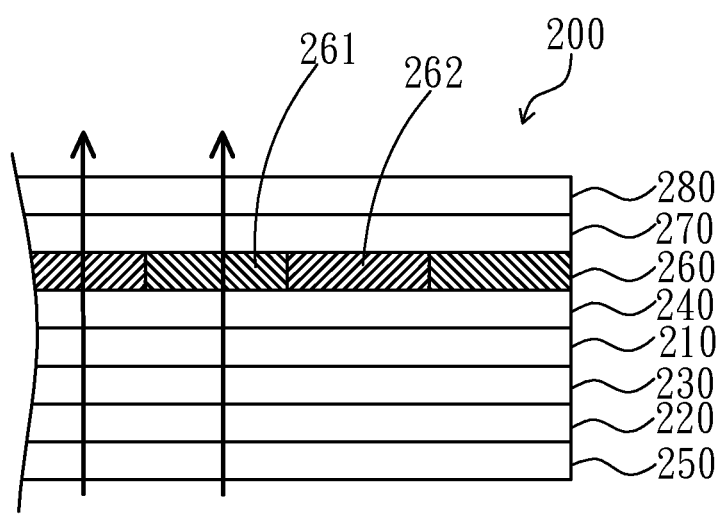
FIG. 3 is a partially cross-sectional view showing a display apparatus according to a second embodiment of the present invention.

Referring to FIG. 3, a partially cross-sectional view showing a display apparatus according to a second embodiment of the present invention is illustrated. The display panel 200 of the second embodiment can comprise a first substrate 210, a second substrate 220, a liquid crystal layer 230, a first polarizer 240, a second polarizer 250, a half (½) wave plate 260, a quarter (¼) wave plate 270 and a cover substrate 280. The half wave plate 260 includes a plurality of first half wave rows 261 and a plurality of second half wave rows 262. The half wave rows 261 and 262 are alternately arranged on the same layer for phase retarding and compensating the chromatic dispersion.

Figure 4:
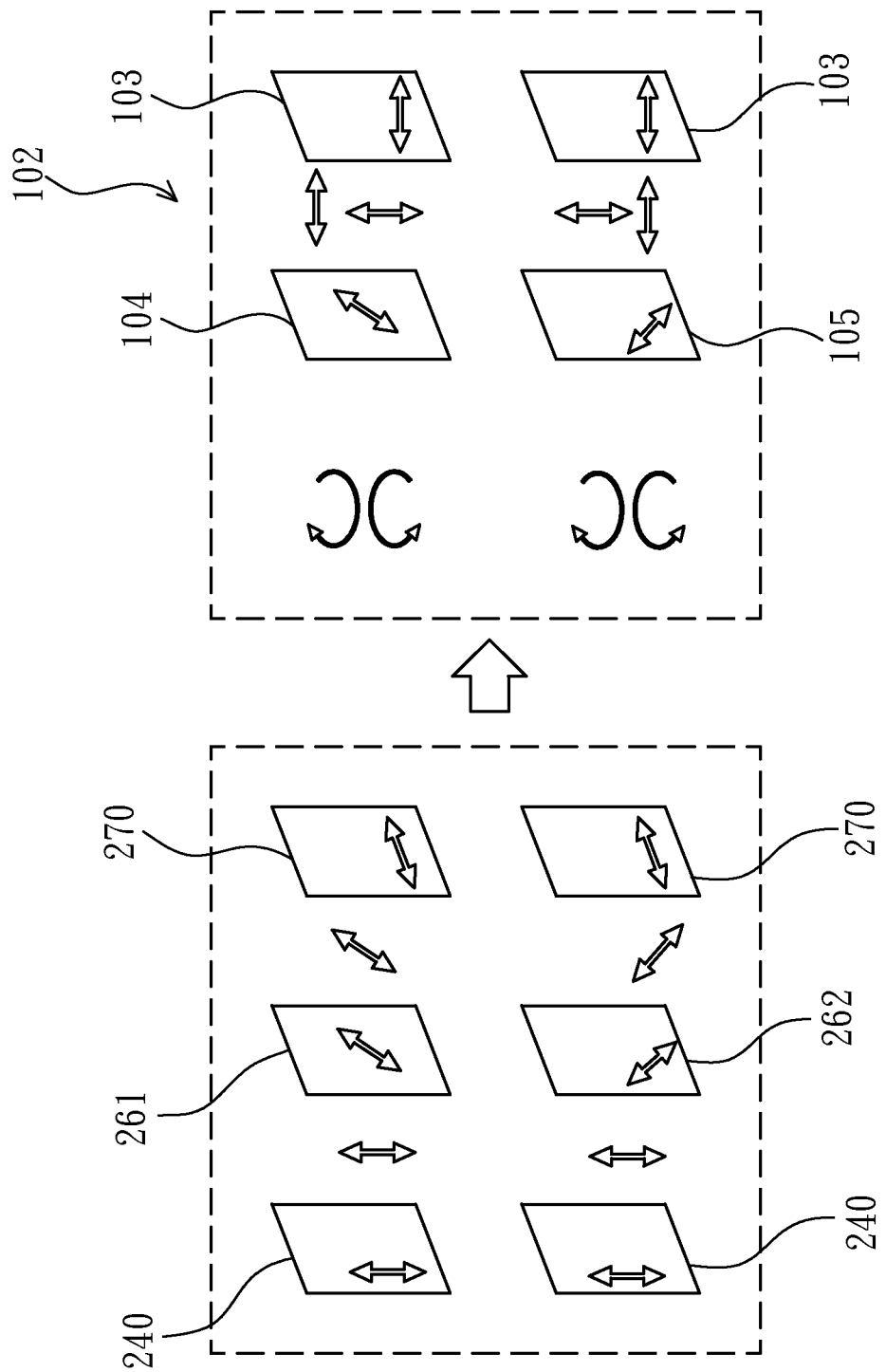
FIG. 4 is a schematic diagram showing a polarized light of the display apparatus according to the second embodiment of the present invention.

Referring to FIG. 4, a schematic diagram showing a polarized light of the display apparatus according to the second embodiment of the present invention is illustrated. In the second embodiment, an angle ψ (with allowable tolerance of ±15°) is between an optical axis of the quarter wave plate 270 and a transmission axis of the first polarizer 240. Angles θ1 (i.e. clockwise direction) and θ2 (i.e. anti-clockwise direction) (with allowable tolerance of ±15°) are between the half wave rows 261 and 262 and the transmission axis of the first polarizer 240, respectively, and formulas are expressed as follows:

$$2\theta 1+45=\psi+180*N, \quad (2)$$

$$2\theta 2+45=\psi+180*N (N \text{ is an integer}). \quad (3)$$

Referring to FIG. 4 again, for example, ψ may be 90 degrees, θ1 may be 22.5 degrees, and θ2 may be 22.5 degrees. Therefore, incorporating with the above-mentioned equations (2) and (3), a great optical effect between the wave plates 260 and 270 can be ensured for enhancing the 3D image effect of the display apparatus.

Referring to FIG. 4 again, the light emitted from the first polarizer 240 is the linearly polarized light at 90 degrees. After passing through the half wave rows 261 with the optical axis at 67.5 degrees, the light is transformed into the linearly polarized light at 45 degrees. Subsequently, after passing through the quarter wave plate 270 with the optical axis at 0 degree, the light is transformed into the left handed circularly polarized light. When the linearly polarized light at 90 degrees passes through the half wave rows 262 with the optical axis at 112.5 degrees, the light is transformed into the linearly polarized light at 315 degrees. Subsequently, after passing through the quarter wave plate 270 with the optical axis at 0 degree, the light is transformed into the right handed circularly polarized light.

When a user views the 3D images of the display apparatus of the present embodiment, the left handed circularly polarized light, which is formed by the half wave rows 261 and the quarter wave plate 270, is only allowed to pass through one side (a right side or a left side corresponding to the first quarter wave plate 104) of the polarizer glasses 102, and the right handed circularly polarized light, which is formed by the half wave rows 262 and the quarter wave plate 270, is only allowed to pass through another side (corresponding to the second quarter wave plate 105) of the polarizer glasses 102. In other words, the user's eyes can see images of different pixel rows of the display panel 200, respectively, thereby forming the 3D image effect.

Figure 5:
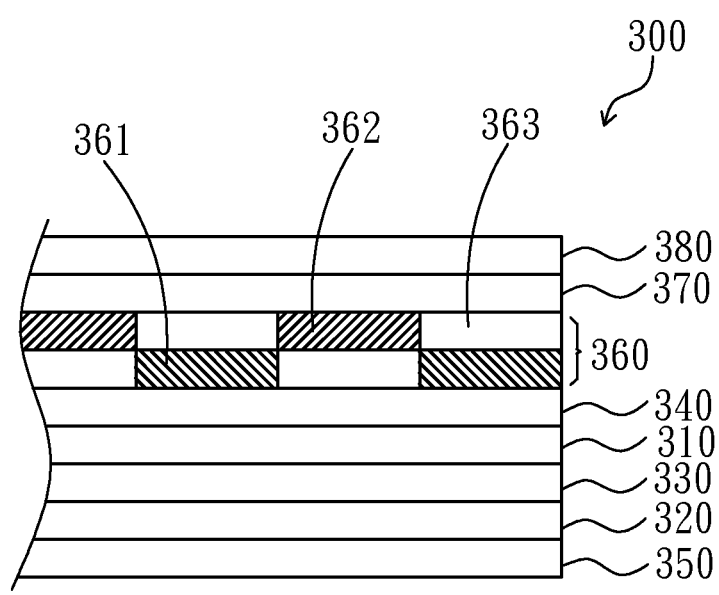
FIG. 5 is a partially cross-sectional view showing a display apparatus according to a third embodiment of the present invention.

Referring to FIG. 5, a partially cross-sectional view showing a display apparatus according to a third embodiment of the present invention is illustrated. The display panel 300 of the second embodiment can comprise a first substrate 310, a second substrate 320, a liquid crystal layer 330, a first polarizer 340, a second polarizer 350, a half (½) wave plate 360, a quarter (¼) wave plate 370, and a cover substrate 380. The half wave plate 360 includes a plurality of first half wave rows 361, a plurality of second half wave rows 362, and a plurality of isotropic material rows 363. The half wave rows 361 and 362 are alternately arranged on different layers, and the isotropic material rows 363 are arranged between the half wave rows 361 and 362.

As described above, the display panel of the present invention and the display apparatus using the same can form 3D image effect and improve chromatic dispersion problem in the conventional pattern retarder display, hence reducing the image crosstalk of the display apparatus to enhance the image quality thereof.

The present invention has been described above with a preferred embodiment thereof, and it is understood that many changes and modifications to the described embodiment can be carried out without departing from the scope and the spirit of the invention that is intended to be limited only by the appended claims.

What is claimed is:

1. A display panel, wherein the display panel comprises:
    a first substrate;
    a second substrate;
    a liquid crystal layer formed between the first substrate and the second substrate;
    a first polarizer disposed at an outer side of the first substrate;
    a second polarizer disposed at an outer side of the second substrate;
    a half (½) wave plate disposed on the first polarizer, wherein the half wave plate comprises at least two first half wave rows and second half wave rows, and a predetermined interval is therebetween each two of the adjacent first half wave rows, and the second half wave rows are alternately arranged with the first half wave rows on different layers;
    a quarter (¼) wave plate disposed on the half wave plate; and
    a cover substrate disposed on the quarter wave plate;

wherein an angle ψ is between an optical axis of the quarter wave plate and a transmission axis of the first polarizer, and angles θ1 and θ2 are between the first and the second half wave rows and the transmission axis of the first polarizer, respectively, and formulas are expressed as follows:

$$2\theta_1 + 45 = \psi + 180 * N,$$

$$2\theta_2 + 45 = \psi + 180 * N,$$

wherein N is an integer.

2. The display panel according to claim 1, wherein the half wave plate further comprises a plurality of isotropic material rows, and the isotropic material rows are arranged between the first half wave rows and the second half wave rows.

3. A display panel, wherein the display panel comprises:
a first substrate;
a second substrate;
a liquid crystal layer formed between the first substrate and the second substrate;
a first polarizer disposed at an outer side of the first substrate;
a second polarizer disposed at an outer side of the second substrate;
a half (½) wave plate disposed on the first polarizer, wherein the half wave plate includes
at least two first half wave rows, and a predetermined interval is therebetween each two of the adjacent first half wave rows, and the half wave plate further comprises a plurality of second half wave rows, and the first half wave rows are alternately arranged with the second half wave rows; and
a quarter (¼) wave plate disposed on the half wave plate;
wherein an angle ψ is between an optical axis of the quarter wave plate and a transmission axis of the first polarizer, and angles θ1 and θ2 are between the first and the second half wave rows and the transmission axis of the first polarizer, respectively, and formulas are expressed as follows:

$$2\theta_1 + 45 = \psi + 180 * N,$$

$$2\theta_2 + 45 = \psi + 180 * N,$$

wherein N is an integer.

4. The display panel according to claim 3, wherein the display panel further comprises a cover substrate disposed on the quarter wave plate.

5. The display panel according to claim 3, wherein the half wave plate further comprises a plurality of isotropic material rows, and the first half wave rows and the isotropic material rows are alternately arranged.

6. The display panel according to claim 3, wherein the first half wave rows and the second half wave rows are alternately arranged on the same layer.

7. The display panel according to claim 3, wherein the first half wave rows and the second half wave rows are alternately arranged on different layers.

8. The display panel according to claim 7, wherein the half wave plate further comprises a plurality of isotropic material rows, and the isotropic material rows are arranged between the first half wave rows and the second half wave rows.

9. A display apparatus, wherein the display apparatus comprises a backlight module and a display panel according to claims 3.

10. A display apparatus, wherein the display apparatus comprises a backlight module and a display panel according to claims 4.

11. A display apparatus, wherein the display apparatus comprises a backlight module and a display panel according to claims 5.

12. A display apparatus, wherein the display apparatus comprises a backlight module and a display panel according to claims 6.

13. A display apparatus, wherein the display apparatus comprises a backlight module and a display panel according to claims 7.

* * * * *